United States Patent Office 3,597,167
Patented Aug. 3, 1971

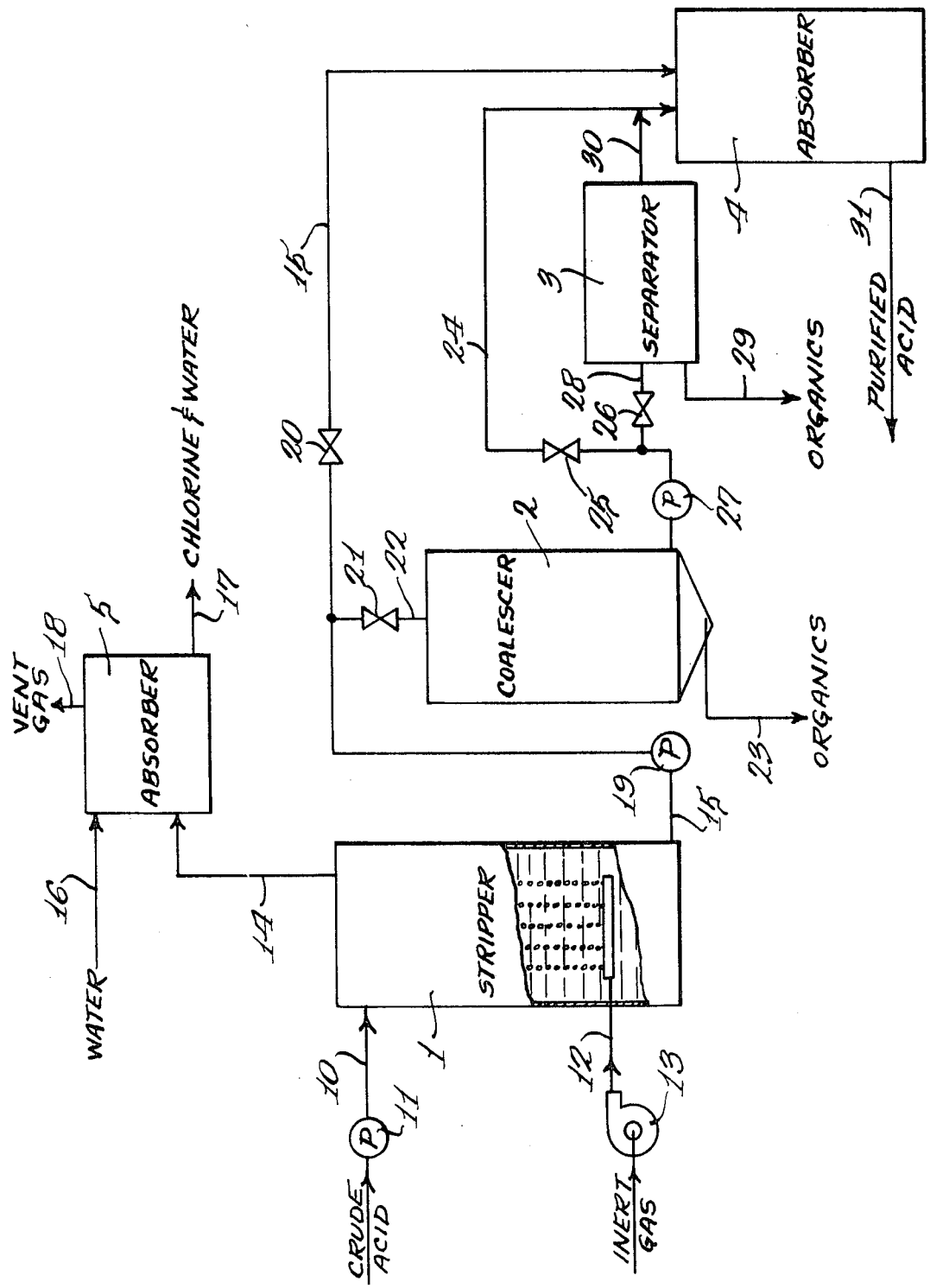

3,597,167
REMOVAL OF CHLORINE AND ORGANIC
IMPURITIES FROM HYDROCHLORIC ACID
Daniel R. Marks and Charles R. Hanson, Memphis, Tenn., assignors to Velsicol Chemical Corporation, Chicago, Ill.
Filed Mar. 29, 1968, Ser. No. 717,140
Int. Cl. B01d 15/00; C01b 7/08
U.S. Cl. 23—306                                13 Claims

ABSTRACT OF THE DISCLOSURE

A continous process for the purification of hydrochloric acid contaminated with both chlorine and organic material which comprises charging a stream of the contaminated acid to a stripping zone, simultaneously charging a stream of inert gas to the stripping zone and into contact therein with the contaminated acid to effect the desorptive removal of substantially all of the chlorine contained in the acid, passing the stripped acid effluent from the stripping zone to an adsorption zone and contacting it therein with a solid adsorbent to effect the adsorptive removal of the organic material from the stripped acid, and recovering the acid effluent from the adsorption zone with a substantially reduced quantity of both chlorine and organic material.

This invention relates to a continuous process for purifying hydrochloric acid and more particularly to a process for removing both chlorine and organic materials from hydrochloric acid.

One principal method for preparing hydrochloric acid involves absorbing gaseous hydrogen chloride in water. Because the gaseous hydrogen chloride employed in the absorption is often derived from various chlorination reactions which generate the hydrogen chloride as a by-product, the crude acid obtained in the absorption is often contaminated with substantial quantities of chlorine and organic materials. In purifying this crude acid to remove the chlorine and organic material various techniques and procedures have been employed such as stripping or desorbing with inert gases, solvent extraction or adsorption with solid sorbents. Various difficulties are encountered however in employing these purification procedures which inhibit effective removal of the impurities to the very low levels required by industry. For example, when stripping or desorbing techniques are utilized there is a simultaneous loss of substantial amounts of hydrogen chloride which reduces the acid concentration and consequently the acid value and when adsorption techniques are employed in the presence of substantial quantities of chlorine, the effectiveness of the adsorption is reduced and the useful life of the solid adsorbent is greatly shortened.

Accordingly, it is an object of this invention to provide a continuous process for the purification of hydrochloric acid contaminated with both chlorine and organic materials. Another object is to provide a process to effectively remove both types of impurities to very low levels without simultaneously effecting substantial loss of hydrogen chloride and moreover while maintaining highly efficient adsorption with long adsorbent life. These and other objects of this invention will be apparent from the following further detailed description thereof.

The objects of this invention are realized by effecting the purification of contaminated hydrochloric acid according to the processing sequence of charging a stream of the contaminated acid to a stripping zone, simultaneously charging a stream of inert gas to the stripping zone and contacting it therein with the contaminated acid to effect the desorption of substantially all of the chlorine contained in the acid, passing the stripped acid effluent from the stripping zone to an adsorption zone and contacting it therein with a solid adsorbent to effect the removal of organic material from the stripped acid and recovering the acid effluent from the adsorption zone substantially free of both chlorine and organic material. By effecting the purification of contaminated hydrochloric acid according to this processing sequence a highly efficient removal of both the chlorine and organic material can be achieved to very low levels without substantial loss of hydrogen chloride and moreover with prolonged adsorbent life.

In order that the present invention can be more readily understood it will be described with reference to the attached drawing which illustrates a diagrammatic flow arrangement of one embodiment embraced within the scope of this invention. A feed stream of comtaminated acid is charged via line 10 to a stripping zone, represented by stripper 1, at a rate controllable by pumping means 11. The acid feed stream typically originates from a hydrogen chloride absorber and is contaminated with both chlorine and organic material. Because the processing procedure of this invention is particularly effective in reducing the quantity of chlorine in the acid, the concentration of chlorine in the acid feed can be relatively high and typically ranges from about 1500 to about 3000 parts per million by weight of chlorine. The composition of the organic material contained in the contaminated acid feed stream will vary depending up the particular chlorination process producing the hydrogen chlorine charged to the water absorber. Usually, however, the organic material consists of chlorinated and nonchlorinated organic materials having from one to about six carbon atoms existing in both straight chain and ring form. These organic materials are usually present in the feed stream as materials both soluble and insoluble in the aqueous acid phase. Generally, the total concentration of organic material present in the acid feed stream ranges from about 70 to about 200 parts per million by weight. The acid feed stream is charged via line 10 preferably to an upper portion of the stripper 1 so as to flow upwardly therein. Simultaneously an inert gas stream preferably consisting primarily of air is charged via line 12 at a rate controllable by blower means 13 to a lower portion of stripper 1 so as to flow upwardly therein and into contact with the downward flowing acid in counter-current flow. Other gases can be employed as the inert gas in place of or in combination with air and include such gases as nitrogen although air is generally preferred. The chlorine impurity as well as any volatile organic material is stripped or desorbed from the acid by the upward flowing inert gas which exits stripper 1 via line 14 while the stripped or desorbed acid exits via line 15.

Stripper 1 suitably comprises a vertical reactor of conventional design for effecting continuous contacting of liquids and gases preferably in counter-current flow. The stripper can be packed with suitable contacting material, such as ceramic or porcelain Raschig rings or Berl saddles, stationed within stripper 1, preferably in a fixed bed. A particularly preferred procedure of this invention, however, especially to increase the desorptive removal of large amounts of chlorine without simultaneously desorbing substantial quantities of hydrogen chloride is to maintain the stripper 1 free of any solid contacting material. This is effected by utilizing a sparging technique to break up the inert gas stream entering stripper 1 via line 12 into a plurality of inert gas streams which flow upwardly within the liquid acid forming bubbles which provide a high degree of contact between the inert gas and acid. This is achieved by charging the inert gas via line 12 to a sparger located preferably at a lower portion of stripper 1 and is illustrated in simplified form in the exposed section of stripper 1 of the drawing. The sparger used can consist of one or more distributors of inert material having a plurality of small diameter holes on its surface which serves to divide and to distribute the inert gas stream into a plurality of smaller gas streams. Alternatively, the sparger can consist of a porous or perforate material which breaks up the gas stream as it passes from a hollow intersection through the perforate outer shell. When utilizing the preferred sparging technique of this invention the surface area of the sparger should be adjusted in respect to the cross-sectional area of stripper 1 so as to achieve even distribution of the upward flowing finely divided gas stream in the acid and to prevent undesirable channelling or backmixing of the acid within stripper 1. Generally to obtain suitable flow patterns of the inert gas and the acid within stripper 1 the ratio of the surface area of the sparger should be maintained with respect to the cross sectional area of stripper 1 to within a ratio ranging from about 1 to about 1.75 respectively.

The conditions at which stripper 1 is maintained can be varied over a relatively wide range. Generally the temperature at atmospheric pressure can range from about 0° C. to about 85° C. A relatively low temperature range is preferred however, particularly to minimize the desorption of hydrogen chloride with the resultant reduction in acid concentration and generally ranges from about 20° to about 40° C. The relative rates of the inert gas and acid charged to stripper 1 are an important factor in effecting efficient removal of the chlorine without simultaneously effecting a substantialy loss of hydrogen chloride. The ratio of the rates of inert gas and contaminated acid per unit time charged to stripper 1 can be varied and the optimum ratio employed will depend upon such factors as the volume of acid charged, the diameter of stripper 1, the presence or absence of solid contacting material and the temperature at which stripper 1 is operated. Generally, the air to acid ratio per unit time should be maintained within the limits of from about 1 to about 20 cubic feet of inert gas (as measured at standard temperature and pressure) per 1 gallon of acid feed. A more limited range is preferred particularly to maximize chlorine removal and to minimize hydrogen chloride loss and ranges within the limits of about 5 to about 7 cubic feet of inert gas per gallon of acid charged.

The residence time or contact time of the inert gas and acid in stripper 1 required to effectively desorb substantially all of the chlorine will vary depending upon such factors as the quantity of the chlorine contained in the acid, the ratio of the inert gas to acid utilized and the stripping temperature as well as the presence or absence of solid contacting material. Generally, when operating stripper 1 according to the conditions of this invention the residence time or contact period of the inert gas and the acid within stripper 1 based upon the residence time of the acid can range from about 75 to about 160 minutes.

The overhead gases exiting stripper 1 via line 14 can, if desired, be treated to recover the chlorine and the small quantity of hydrogen chloride contained therein. This can be effected by passing the chlorine containing gas via line 14 to an absorption zone represented by absorber 5. The gas can then be countercurrently contacted with a water stream charged to absorber 5 via line 16 to absorb the chlorine and hydrogen chloride. The water stream containing the absorbed chlorine and hydrogen chloride exits absorber 5 via line 17 and can be passed to storage and the vent gas substantially free of chlorine and hydrogen chloride can be exhausted from absorber 5 and the system via line 18.

The stripped or desorbed acid containing a substantially reduced quantity of chlorine but still containing a substantial amount of the initial quantity of organic material exits stripper 1 via line 15 and can be passed via line 15 by pumping means 19 either to an adsorption zone or preferably first to a coalescing zone and then to the adsorption zone. In the processing procedure of this invention the insoluble organic material dispersed within the aqueous acid stream exiting stripper 1 can be effectively removed by passing the stripped acid to a coalescing zone represented by coalescer 2. This is effected by closing valve means 20 in line 15 and opening valve means 21 causing the stripped acid to flow from line 15 to line 22 and into coalescer 2. Coalescer 2 can comprise a reactor of conventional design suitable for contacting liquids with solid contact material. The coalescer 2 contains finely divided or particulate solid contacting material preferably in a fixed bed over which the stripped acid passes preferably in downward flow. As the stripped acid contacts the particles of solid contact material the dispersed droplets of insoluble material coalesce forming larger droplets which readily separate from the aqueous acid phase. The particles of solid contacting material employed in coalescer 2 can comprise a wide variety of conventional solid contacting materials which are inert to the aqueous acid and capable of providing a relatively large surface area. Typical materials which can be employed include quartz chips, poreclain, ceramics, sands, aluminas, silica-alumina or activated carbons. Preferably the solid contacting material employed in coalescer 2 has some adsorptive capacity so as to adsorptively remove at least a portion of soluble organic material as well as to adsorptively reduce the level of any residual chlorine remaining in the stripped acid. Suitable materials for this purpose include silica, activated carbons or sand with sand being conveniently employed in most operations. The quantity of the contacting material present in coalescer 2 will depend upon the particular contacting material employed, the quantity of the insoluble organic material dispersed in the aqueous acid and the volume and rate of acid charged to coalescer 2. Generally, when employing such contacting materials as sand or high purity silica the contacting material can be present in from about 25 pounds to about 200 pounds of solid contacting material per 1 gallon of acid per minute. The temperature at which coalescer 2 is operated is not particularly important and generally it can be operated at the same temperature range as stripper 1 which will be regulated by the ambient temperature of the stripped acid stream entering coalescer 2 via lines 15 and 22. The rate of stripped acid charged to coalescer 2 under steady state conditions suitably will equal the rate of contaminated acid charged to stripper 1. If a different rate is desired, appropriate hold or surge tanks, not illustrated, can be employed along line 15. The coalesced or enlarged droplets of the dispersed, insoluble organic materials formed in coalescer 2 can be separated from the aqueous acid by simple decantation means. To effect this separation, suitable entraining or trapping means located in the lower portion of coalescer 2 can be employed to separate the coalesced insoluble organic materials which then can be removed and exhausted from coalescer 2 and from the system via line 23. The acid effluent exits coalescer 2 and can then be passed via line 24 with valve means 25 open and valve means 26 closed by means of pump 27 to an adsorption zone.

When the quantity of insoluble organic materials dispersed within the stripped acid is substantial, it may be preferable to effect the separation or removal of the coalesced organic material in a separation zone apart from coalescer 2 which avoids any separation of coalesced material in the lower portion of coalescer 2. This can be effected by closing valve 25 and opening valve 26 causing the acid effluent from coalescer 2 to flow via lines 24 and 28 to a separation zone represented by separator 3. Separator 3 can comprise any standard type of apparatus wherein different liquid phases can be separated and preferably comprises a decanter wherein the coalesced inorganic material can be effectively separated continuously from the aqueous acid and discharged from separator 3 and the system via line 29. The acid effluent flowing from separator 3 substantially free of chlorine and dispersed insoluble organic material is then charged via lines 30 and 24 to an adsorption zone represented by adsorber 4. Alternatively, if the separator 3 is not employed then the acid effluent is charged to adsorber 4 via line 24 with valve 25 open and valve 26 closed.

Adsorber 4 can comprise any standard type of reactor wherein liquids can be contacted with finely divided solid contacting material. The acid effluent entering adsorber 4 contacts a finely divided or particulate solid absorbent maintained within adsorber 4 preferably in a stationary bed and flows over the absorbent preferably in downward flow and exits the adsorber substantially free of both chlorine and organic material and is passed to storage via line 31. Because most of the chlorine originially contained in the acid feed to stripper 1 has now been removed, the adsorption of the organic material is particularly efficient in reducing the organic content to very low levels. Moreover, by effecting the adsorption in the absence of substantial quantities of chlorine, the effective life of the solid adsorbent employed in the adsorber is greatly prolonged. The adsorbent material contained within adsorber 4 can be selected from a wide variety of different conventional solid adsorbents which are inert to hydrochloric acid. Typical adsorbents which can be suitably employed include charcoal, activated carbons, silicas or silica alumina with activated carbons being particularly suitable. The quantity of the solid adsorbent maintained within adsorber 4 can be varied with the amount used being dependent upon such factors as the quantity of soluble organics present in the stripped acid, the particular type of solid adsorbent used and the volume of acid charged. Generally, the quantity of the adsorbent can be selected upon the basis of the amount of organics adsorbable per unit weight of adsorbent. For example, when using activated carbons, the ratio of the weight of the organics to the weight of the activated carbon will range from about 0.10 to about 0.25 or about 0.18. The conditions at which the adsorption is effected can be varied and typically it can be suitably effected at an ambient temperature corresponding to the temperature of the acid charged to adsorber 4. Generally this temperature should range from about 0° C. to about 85° C. with a range of about 20° C. to about 40° C. usually being preferred. If the acid feed to adsorber 4 is not within this desirable temperature range, then the acid stream can be heated or cooled by passing it through a heat exchanger, not illustrated, located in line 15 or 24. The rate at which the acid is charged to adsorber 4 under steady state conditions will substantially equal the rate of the acid effluent from coalescer 2 controllable by pumping means 27. However, if a different rate is desired then appropriate hold or surge tanks, not illustrated, can be employed along line 15 or 24.

In a less preferred procedure of this invention a coalescer zone is not employed and the removal of both the soluble and insoluble organic material can be effected solely within the adsorption zone. While this processing procedure is less desirable, it can be effectively employed when there is a relatively small quantity of insoluble organic materials dispersed in the aqueous acid effluent from stripper 1. This process procedure can be achieved by opening valve means 20 and closing valve means 21 causing the stripped acid from stripper 1 to by-pass the coalescing zone and to flow directly via line 15 to adsorber 4. The adsorption procedure and condition employed in this procedure is substantially the same as in the preferred processing procedure where the stripped acid is first charged to a coalescing zone with the major modification being that the quantity of the solid adsorbent can be increased in adsorber 4 to compensate for the increased adsorption load required to remove the insoluble organic material along with the soluble organic material.

While it is not illustrated in the accompanying drawing, the processing procedure of this invention can be effected by combining both the coalescing zone and the adsorption zone within one reactor. This can be effected by having the coalescing zone comprising a stationary bed of a solid contact material, such as sand, located in an upper portion of a tubular reactor and having the adsorption zone comprising a fixed bed of solid adsorbent, such as activated carbon, located in the lower portion of the same tubular reactor. Suitable trapping means can then be utilized to separate the two zones and to remove the coalesced insoluble organic materials from the aqueous acid prior to contacting it with the adsorbent in the adsorption zone.

The following example is offered to illustrate the processing procedure of this invention but it is not intended to limit the process to the particular procedures or conditions illustrated therein.

EXAMPLE

The purification of contaminated hydrochloric acid was effected according to this invention by the following procedure:

A purification run was effected using a processing procedure which consisted of charging a stream of contaminated acid to the upper portion of a stripping zone. Simultaneously, a stream of air was charged to the lower portion of the stripping zone and into contact with the downward flowing acid in countercurrent flow. The stripped acid exiting the stripping zone was passed to a storage tank and from there to the upper portion of a coalescing zone and into contact in downward flow with a fixed bed of a finely divided solid contacting material. The effluent from the coalescing zone was charged to the upper portion of an adsorption zone and into contact in downward flow with a fixed bed of a finely divided solid adsorbent. The purified acid having a substantially reduced level of contaminates was then withdrawn from the adsorption zone and passed to storage.

The stripping zone used in the runs consisted of a vertical reactor constructed of polyester material having a height of six feet and an inside diameter of two feet and was free of solid contacting material. The air stream charged to the reactor was passed into a sparging device which divided and dispersed the air stream into a plurality of smaller air streams which formed bubbles within in the acid in the lower portion of the stripping zone. The sparging device consisted of a distributor of inert material having a hollow intersection and a perforate outer shell through which the air stream passed into contact with the acid as a plurality of smaller air streams.

The overhead vent gases were passed to a continuous water scrubber to remove the chlorine and small quantity of hydrogen chloride contained therein prior to exhausting the gases to the atmosphere.

The flow rates of both the acid and the air charged to the stripping zone were regulated and adjusted by rotameters to obtain the desired air to acid ratio. A pump was used to transfer the stripped acid effluent from the lower portion of the stripping zone to the storage tank and from there to the upper portion of the coalescing zone. The coalescing zone used in the run consisting of a fixed bed of solid contacting material was contained within a vertical glass-lined reactor having an inside diameter of about six inches. The adsorption zone used comprising a fixed bed of finely divided solid adsorption material was located below the coalescer zone in the same glass reactor. The effluent acid exiting the adsorption zone was analyzed for chlorine and organic material and these data as well as the conditions used for the run are summarized beow:

TABLE

Stripping zone

| | |
|---|---|
| HCl; gal./min. | 1.18 |
| Air; ft.$^3$ (S.T.P.) min. | 5.77 |
| Temperature of feed acid, ° C. | 44 |
| Acid residence time, min. | 100 |
| Liquid height, ft. | 5 |
| Air/HCl ratio ft.$^3$/min./gal./min. | 4.88 |

Coalescing zone

| | |
|---|---|
| Stripped acid; gal./min. | 0.56 |
| Packing: | |
| Type | Silica |
| Bed height, in. | 18 |
| Temperature, °C. | 45 |

Adsorption zone

| | |
|---|---|
| Coalesced acid; gal./min. | 0.56 |
| Adsorbent: | |
| Type | (1) |
| Bed height, in. | 18 |
| Weight, lbs. | 9 |
| Temperature, °C. | 45 |

¹ Activated carbons.

ACID ANALYSIS

| | |
|---|---|
| HCl, weight percent | 32.69 |
| Chlorine, parts per million by weight | 2217 |
| Organics, parts per million by weight | 172 |
| Product: | |
| HCl, weight percent | 32.22 |
| Chlorine, parts per million by weight | 126 |
| Organics, parts per million by weight | 124 |

We claim:

1. A continuous process for the purification of hydrochloric acid contaminated with both chlorine and organic material which comprises charging a stream of the contaminated acid to a stripping zone, simultaneously charging a stream of air or nitrogen to the stripping zone and into contact therein with the contaminated acid to effect the desorptive removal of substantially all of the chlorine contained in the acid, passing the stripped acid effluent from the stripping zone to a coalescing zone and contacting it therein with a finely divided solid contacting material selected from the group consisting of quartz chips, porcelain, sand, alumina, silica-alumina and activated carbon to coalesce and effect the removal of insoluble organic material dispersed in the stripped acid and the acid effluent substantially free of such organic material is then passed to an adsorption zone and contacting it therein with a finely divided solid adsorbent selected from the group consisting of charcoal, activated carbon, silicas and silica alumina to effect the adsorptive removal of the remaining organic material from the stripped acid, and recovering the acid effluent from the adsorption zone with a substantially reduced quantity of both chlorine and organic material.

2. The process of claim 1 wherein the inert gas charged to the stripping zone is air and it is contacted therein with the contaminated acid in countercurrent flow.

3. The process of claim 1 wherein the contaminated acid is contacted with air as the inert gas in the stripping zone at a temperature of from about 0 to about 85° C.

4. The process of claim 1 wherein the enert gas and the contaminated acid are charged to the stripping zone at rates adjusted so as to provide a ratio of from about 1 to about 20 cubic feet of gas per one gallon of acid per unit time.

5. The process of claim 1 wherein the solid contacting material contained in the coalescing zone is finely divided silica.

6. The process of claim 1 wherein the contacting of the stripped acid with the solid contacting material in the coalescing zone is effected at a temperature of from about 0 to about 85° C.

7. The process of claim 1 wherein the solid adsorbent in the adsorption zone consists of finely divided activated carbon.

8. The process of claim 1 wherein the contacting of the stripped acid and the adsorbent in the adsorption zone is effected at a temperature of from about 0 to about 85° C.

9. The process according to claim 1 wherein the contaminated acid is charged to the upper portion of the stripping zone, the inert gas is simultaneously charged to a lower portion of the stripping zone and into contact with the contaminated acid in countercurrent flow, the charge rates of the acid and the inert gas are adjusted to provide a ratio of from about 1 to about 20 cubic feet of gas per one gallon of acid per unit time.

10. The process of claim 9 wherein the solid contacting material maintained in the coalescing zone is finely divided silica.

11. The process of claim 9 wherein the solid adsorbent maintained in the adsorption zone is finely divided, activated carbon.

12. The process of claim 9 wherein the contaminated acid is contacted with air as the inert gas in the stripping zone at a temperature of from about 20° C. to about 40° C.

13. The process of claim 9 wherein the contaminated acid and air as the inert gas are charged to the stripping zone at rates adjusted so as to provide a ratio of from about 5 to about 7 cubic feet of air per 1 gallon of acid per unit time.

References Cited

UNITED STATES PATENTS

| | | | |
|---|---|---|---|
| 1,847,435 | 3/1932 | Low | 23—154X |
| 1,853,330 | 4/1932 | Barstow | 23—154X |
| 2,558,011 | 6/1951 | Sprauer | 23—154 |
| 3,203,894 | 8/1965 | Ikuno | 210—39X |
| 3,244,621 | 4/1966 | Bouthilet | 210—39X |
| 3,314,753 | 4/1967 | Richert | 23—154 |
| 3,444,079 | 3/1969 | Bowers | 210—39X |
| 3,492,091 | 1/1970 | Goldman | 23—154 |

NORMAN YUDKOFF, Primary Examiner

S. J. EMERY, Assistant Examiner

U.S. Cl. X.R.

23—307, 312, 154; 210—40